(12) United States Patent
Cherian et al.

(10) Patent No.: US 8,073,942 B2
(45) Date of Patent: Dec. 6, 2011

(54) SYSTEM AND METHOD FOR STORAGE DISCOVERY IN A STORAGE AREA NETWORK USING DEVICE DOMAINS UNDER CONTROL OF A STORAGE DEVICE

(75) Inventors: Jacob Cherian, Austin, TX (US); Gaurav Chawla, Austin, TX (US); Lazarus J. Vekiarides, West Roxbury, MA (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 12/582,269

(22) Filed: Oct. 20, 2009

(65) Prior Publication Data
US 2011/0093576 A1  Apr. 21, 2011

(51) Int. Cl.
*G06F 15/16* (2006.01)
*G06F 15/173* (2006.01)
*G06F 15/177* (2006.01)

(52) U.S. Cl. .................. 709/223; 709/226; 709/213

(58) Field of Classification Search .......... 709/217–228, 709/213
See application file for complete search history.

(56) References Cited

U.S. PATENT DOCUMENTS

| 7,194,538 | B1 | 3/2007 | Rabe et al. | |
|---|---|---|---|---|
| 7,328,260 | B1 | 2/2008 | Muthiyan et al. | |
| 7,401,338 | B1 | 7/2008 | Bowen et al. | |
| 7,403,987 | B1 | 7/2008 | Marinelli et al. | |
| 7,506,040 | B1 | 3/2009 | Rabe et al. | |
| 7,548,924 | B2 * | 6/2009 | Watanabe | 709/223 |
| 2009/0161692 | A1 * | 6/2009 | Hirata et al. | 370/466 |
| 2009/0292789 | A1 * | 11/2009 | Nagai et al. | 709/213 |
| 2010/0106822 | A1 * | 4/2010 | Nagai et al. | 709/224 |
| 2010/0198972 | A1 * | 8/2010 | Umbehocker | 709/226 |

* cited by examiner

*Primary Examiner* — Haresh N Patel
(74) *Attorney, Agent, or Firm* — Larson Newman, LLP

(57) ABSTRACT

A storage area network (SAN) includes a management server, a storage device, and a management station coupled to a fabric. The management server implements device domains on the SAN. The storage device instructs the management server to add new device domains on the SAN. The management station defines the new device domains to include the storage device and an initiator coupled to the fabric, and directs the storage device to instruct the management server to add the new device domains. A method includes coupling a management server to a SAN fabric, implementing device domains in the management server, defining a new device domain that includes a storage device and an initiator coupled to the SAN, and coupling a storage device to the SAN fabric, the storage device being operable to instruct the management server to add the new device domain.

19 Claims, 2 Drawing Sheets

SYSTEM AND METHOD FOR STORAGE DISCOVERY IN A STORAGE AREA NETWORK USING DEVICE DOMAINS UNDER CONTROL OF A STORAGE DEVICE

FIELD OF THE DISCLOSURE

This disclosure relates generally to information handling systems, and relates more particularly to a storage area network in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, data storage systems, and networking systems. An information handling system can include a storage area network that includes a mechanism to set up and control the storage resources that are accessible to the information handling system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are illustrated and described with respect to the drawings presented herein, in which.

The use of the same reference symbols in different drawings indicates similar or identical items.

DETAILED DESCRIPTION OF DRAWINGS

Figure 1:
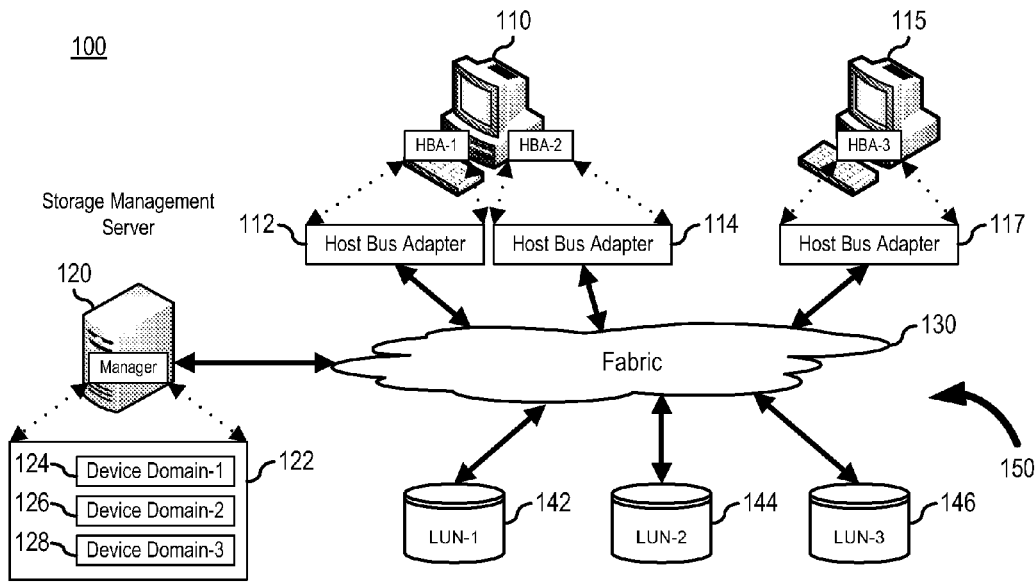
FIG. 1 is a block diagram illustrating an information handling system with a storage area network, according to an embodiment of the present disclosure

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can be used in this application. The teachings can also be used in other applications, and with several different types of architectures, such as distributed computing architectures, client/server architectures, or middleware server architectures and associated resources.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile such as random-access memory), nonvolatile such as read-only memory or flash memory) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as various input and output (I/O) devices such as a keyboard, a mouse, a video/graphic display, or any combination thereof. The information handling system can also include one or more buses operable to transmit communications between the various hardware components. Portions of an information handling system may themselves be considered information handling systems.

Portions of an information handling system, when referred to as a "device," a "module," or the like, can be configured as hardware, software (which can include firmware), or any combination thereof. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be software, including firmware embedded at a device, such as a Pentium class or PowerPC™ brand processor, or other such device, or software capable of operating a relevant environment of the information handling system. The device could also be a combination of any of the foregoing examples of hardware or software. Note that an information handling system can include an integrated circuit or a board-level product having portions thereof that can also be any combination of hardware and software.

Devices or programs that are in communication with one another need not be in continuous communication with each other unless expressly specified otherwise. In addition, devices or programs that are in communication with one another may communicate directly or indirectly through one or more intermediaries.

An information handling system can include one or more host processing systems, and a storage system that are connected to a common network or data storage fabric. The data storage system can include a storage management server and one or more storage devices. In order to ensure secure access to data, and to avoid data corruption, the data storage system can provide a mechanism to create and maintain device domains that limit the access of a particular host processing system to a subset of the storage devices. In a particular embodiment, described herein, the storage devices include a management station that creates and maintains the device domains on the storage management server, thereby reducing the amount of management activity needed to maintain the information handling system.

FIG. 1 illustrates an information handling system 100 according to an embodiment of the present disclosure, including host processing system 110, one or more additional host processing systems 115, and a storage area network (SAN) 150. SAN 150 includes a storage management server 120, a fabric 130, and one or more logical storage devices represented by storage devices 142, 144, and 146, and labeled LUN-1, LUN-2, and LUN-3, respectively. Host processing systems 110 includes host bus adapters (HBAs) 112 and 114 labeled HBA-1 and HBA-2, respectively, and host processing systems 115 includes host bus adapter 117 labeled HBA-3. Host processing system 110 is connected to fabric 130 through HBAs 112 and 114, and host processing system 115 is connected to fabric 130 through HBA 117. HBAs 112 and 114 are adapted to transfer data between host processing system 110 and fabric 130, and host bus adapter 117 is adapted to transfer data between host processing system 115 and fabric 130 according to a particular protocol associated with fabric 130. A non-limiting example of fabric 130 includes a Small Computer System Interface (SCSI) fabric, a Fibre Channel (FC) fabric, an Internet SCSI (iSCSI) fabric, another data fabric or any combination thereof. Storage management server 120 and storage devices 142, 144, and 146 are connected to fabric 130. A non-limiting example of storage devices 142, 144, and 146 includes a logical unit that may be a disk drive, a drive array, a virtual disk, a logical partition of a disk drive, another storage medium, or any combination thereof.

In operation, host processing systems 110 and 115 store data on a selected one or more of storage devices 142, 144, and 146. In gaining access to a particular storage device 142, 144, or 146, HBAs 112, 114, and 117 will establish a storage session with the particular storage device 142, 144, or 146 through a log-in process. When a particular storage device 142, 144, or 146 is connected to fabric 130, the particular storage device 142, 144, or 146 is configured with log-in credentials that limit access to the storage capabilities of the particular storage device 142, 144, or 146. For example, storage devices 142, 144, and 146 can be configured with an identifier associated with one or more particular HBA 112, 114, and 117. Then, when an HBA 112, 114, or 117 with the proper identifier attempts to log-in to a particular storage device 142, 144, or 146, the storage device 142, 144, or 146 permits that HBA access. When an HBA 112, 114, or 117 without the proper identifier attempts to log-in to a particular storage device 142, 144, or 146, the storage device 142, 144, or 146 denies that HBA access. Note that each storage device 142, 144, and 146 has to be configured before a particular HBA 112, 114, or 117 can access the storage capabilities of storage devices 142, 144, and 146. Typically, configuration of a storage device in a SAN is done when the storage device is added to the SAN, or when the configuration properties changes.

In a particular embodiment, on startup, host processing systems 110 and 115 discover that storage devices 142, 144, and 146 are connected to fabric 130, and each of HBAs 112, 114, and 117 attempt to automatically log-in to each of storage devices 142, 144, and 146. Storage devices 142, 144, and 146 either accept or reject the log-in attempts by HBAs 112, 114, and 117, based upon the associated log-in credentials. In a typical information handling system, the number of storage devices can be smaller than the number of host processing systems, and the host processing systems can have more than one HBA. Thus the individual log-in attempts by the large number of HBAs can constitute a significant load on the storage devices in an information handling system. In another embodiment, when host processing systems 110 or 115 is added to information handling system 100, an administrator (not illustrated) manually configures the associated HBAs 112 and 114, or 117 to log in to an associated storage device 142, 144, or 146. In this way, the number of log-in attempts experienced by storage devices 142, 144, and 146 is reduced. However, in this embodiment, when a storage device 142, 144, or 146 is added to information handling system 100, the administrator will manually reconfigure an associated HBA 112, 114, or 117 with the necessary log-in credentials.

In another embodiment, on startup, host processing systems 110 and 115 discover storage management server 120. Storage management server 120 includes a management system 122 that creates and maintains one or more device domain 124, 126, and 128. Device domains 124, 126, and 128 define the access relationships among HBAs 112, 114, and 117, and storage devices 142, 144, and 146. When a particular HBA 112, 114, or 117 discovers management server 120, management system 120 sends a list of the storage devices 142, 144, or 146 that are included in a particular device domain 124, 126, or 128 that also includes the particular HBA 112, 114, or 117. The particular HBA 112, 114, or 117 then attempts to log-in to storage devices 142, 144, or 146 that are included in the list. The particular HBA 112, 114, or 117 makes no attempt to log-in to storage devices 142, 144, or 146 that are not included in the list. A non-limiting example of a device domain includes an iSCSI device domain, a Fibre Channel zone, another domain defining access relationships, or a combination thereof.

For example, as shown in Table 1, a first device domain labeled DD-1 can be set up to provide storage for a Windows-NT application server environment, where HBA 112 can be associated with a virtual machine that is running Windows-NT on host processing system 110. Host processing system 115 can also be running Windows-NT, and storage device 142 can be formatted with a Windows-NT compatible format. A second device domain labeled DD-2 can be set up to provide storage for a Linux server environment, where HBA 114 can be associated with a virtual machine that is running Linux on host processing system 110, and storage device 144 can be formatted with a Linux compatible format. A third device domain labeled DD-3 can be set up to provide back-up and archive storage for the Windows-NT application server environment, where host processing system 115 can function as the back-up server with access to storage devices 142 and 146. Storage device 164 can also be formatted with a Windows-NT compatible format.

TABLE 1

Device Domains

| Device Domain | Domain Purpose | Host Bus Adapter | Storage Devices |
| --- | --- | --- | --- |
| DD-1 | NT - App Server | HBA-1, HBA-3 | LUN-1 |
| DD-2 | Linux Server | HBA-2 | LUN-2 |
| DD-3 | NT - Backup Server | HBA-3 | LUN-1, LUN-3 |

Thus, for example, when host processing system 115 is running a Windows-NT back-up application, HBA-3 attaches to fabric 130 and discovers storage management server 120. Server manager 122 determines that HBA 117 is associated with device domains 124 and 128. Server manager 122 sends the list of included storage devices 142 and 146 to HBA 117, and HBA 117 attempts to log-in to only storage devices 142 and 146. Thus a storage management server functions to reduce the log-in load on the storage devices in an information handling system and provide logical isolation of devices in the storage fabric. In a particular embodiment, device domains 124, 126, and 128 are created and configured by the administrator using a management station (not illustrated) that is associated with storage management server 120.

Figure 2:
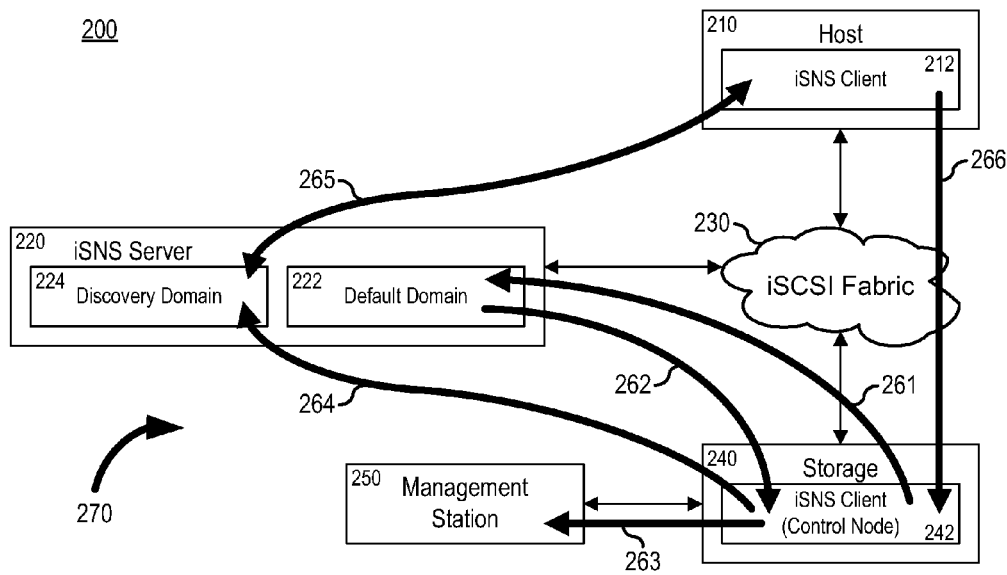
FIG. 2 is a block diagram illustrating an information handling system similar to FIG. 1, and a method of establishing device domains thereon.

FIG. 2 illustrates an information handling system 200 similar to information handling system 100, and a method of establishing device domains thereon. Information handling system 200 includes one or more hosts 210, and a SAN 270. SAN 270 includes an Internet Storage Name Service (iSNS) server 220, an iSCSI fabric 230, one or more storage systems 240, and a management station 250. Host 210 is similar to host processing systems 110 and 115, and includes an iSNS client 212. iSNS client 212 can be integrated into HBA 112, 114, or 117, or can be implemented as a software layer associated with such an HBA. In a particular example, iSNS client 212 can be associated with a particular HBA 112, 114, or 117, such that each HBA 112, 114, and 117 includes an iSNS client, or iSNS client can be associated with a particular host 110 or 115 such that each host 110 and 115 includes an iSNS client, or a combination thereof.

iSNS server 220 is similar to storage management server 120, and includes a default domain 222 and one or more discovery domains (DD) 224. In a particular embodiment, DD 224 describes a discovery domain that includes at least host 210 and storage system 240. iSCSI fabric 230 is similar to fabric 130. Storage system 240 is similar to storage devices 142, 144, and 146, and includes an iSNS client 240. iSNS client 240 is functionally capable of operating as a control node for iSNS server 220. Host 210, iSNS server 220, and storage system 240 are connected to iSCSI fabric 230. Management station 250 is connected to storage system 240. Management station 250 operates to manage the storage functions of storage system 240, and is accessible to an administrator (not illustrated) to configure and maintain storage system 240. In an embodiment (not illustrated), management station 250 is included as a part of storage system 240.

In a particular embodiment, host 210 stores data on storage system 240. When storage system 240 is connected to iSCSI fabric 230, iSNS client 242 discovers iSNS server 220 that in turn registers the presence of storage system 240. When host 210 is connected to iSCSI fabric 230, iSNS client 212 discovers iSNS server 220 that in turn registers the presence of host 210 by adding host 210 to default domain 222. When the administrator uses management station 250 to configure storage system 240 to provide access to host 210, DD 224 is created, as described below, and configured to include host 210 and storage system 240. Optionally, the administrator may configure log-in credentials in iSNS client 212 for storage system 240. iSNS server 220 sends the information from DD 224 to iSNS client 212. Host 210 then logs-in to storage system 240, and the storage capabilities of storage system 240 are then available to host 210.

A method is illustrated with the bold process lines in FIG. 2, where DD 224 is created and configured by the administrator using management station 250. iSNS client 242 sends a query 261 to iSNS server 220 for the list of hosts in default domain 222. iSNS server 220 sends a response 262 to iSNS client 242 with the requested information. Storage system 240 sends the information 263 including the list of hosts in default domain 222 received by iSNS client 242 to management station 250. iSNS client 242 and storage system 240 are configured as a control node for iSNS server 220. Thus, when the administrator configures storage system 240 to provide host 210 access to the storage resources of storage system 240, storage system 240 updates access control mechanisms to provide access to host 210 and determines a configuration for DD 224. The configuration includes host 210, and can also include one or more additional devices including other host processing systems, HBAs, ports, other devices configured as iSCSI initiators on iSCSI fabric 230, or any combination thereof. Storage system 240 then directs iSNS client 242 to send a command 264 to iSNS server 220 to create DD 224 that includes storage system 240 and host 210, along with iSCSI initiator information for the iSCSI initiators (not illustrated) associated with host 210. In addition to creating DD 224, command 264 directs iSNS server 220 to enable DD 224

In response, iSNS server 220 exchanges information 265 with client 212. Information 265 includes a state change notification (SCN) from iSNS server 220 that informs iSNS client 212 and the iSCSI initiators associated with host 210 about the change in iSCSI fabric 230. Further, information 265 includes a query from iSNS client 212 about the state change. In addition, information 265 includes a response from iSNS server 220, informing iSNS client 212 and the iSCSI initiators associated with host 210 of the presence of storage system 240 in DD 224. The iSCSI initiators associated with host 210 are configured to automatically log-in to all storage devices in DD 224, as identified in the response. Thus, because storage system 240 is included in DD 224, the iSCSI initiators log-in 266 to storage system 240 as described above. Other iSCSI initiators that are not included in DD 224 are not informed of the presence of storage system 240, and do not attempt to log-in to storage system 240.

Figure 3:
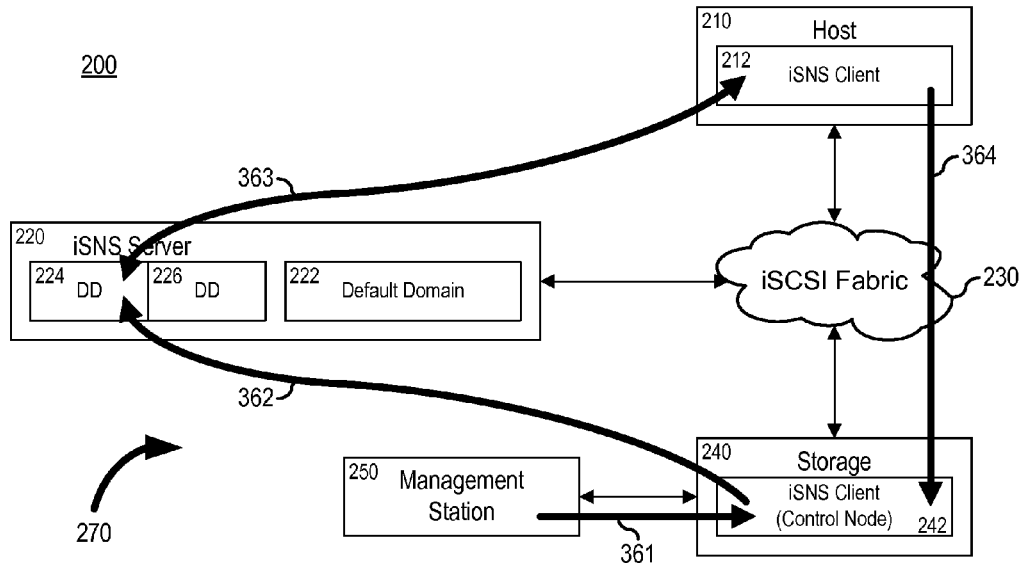
FIG. 3 is a block diagram illustrating the information handling system of FIG. 2, and a method of changing device domains thereon.

FIG. 3 illustrates information handling system 200, and a method of changing device domains thereon. Here, iSNS server 220 includes one or more additional DDs 226. DDs 224 and 226 can be added or changed in response to changing conditions on SAN 270. For example, when a logical storage device (not illustrated) that is associated with iSNS client 212 on another storage device (not illustrated) is moved to storage system 240, DD 226 can be created as described above to associate the logical storage device on iSNS client 242 with iSNS client 212 on host 210. In another example, when the address of storage system 240 is changed on SAN 270, or improved load balancing between host 210 and storage system 240 is desired, then, in one embodiment, DD 226 is created as described above to associate the new address, or additional ports of storage system 240 with iSNS client 212 on host 210, rendering DD 224 redundant. DD 224 can thus be deleted from iSNS server 220. In another embodiment, when the address of storage system 240 is changed on SAN 270, or improved load balancing between host 210 and storage system 240 is desired, then the associations in DD 224 are modified as described below.

A method of changing associations is illustrated with the bold process lines in FIG. 3, where DD 224 is modified by the administrator using management station 250, in response to a change in SAN 270. An administrator determines to change the associations in iSNS server 220, and management station 250 sends information 361 with updated DD association information to storage system 240. Storage system 240 then directs iSNS client 242 to send a command 362 to iSNS server 220 to modify DD 224 to include the updated information associated with storage system 240, host 210, and iSCSI initiator information for the iSCSI initiators (not illustrated) associated with host 210. In addition to modifying DD 224, command 362 directs iSNS server 220 to re-enable DD 224. In response, iSNS server 220 exchanges information 363 with iSNS client 212. Information 363 includes a state change notification (SCN) from iSNS server 220, a query from iSNS client 212 about the state change, and a response, from iSNS server 220, as described above. Since storage system 240 is included in DD 224, the iSCSI initiators log-in 364 to storage system 240 as described above. Other iSCSI initiators that are not included in DD 224 are not informed of the presence of storage system 240, and do not attempt to log-in to storage system 240.

Figure 4:
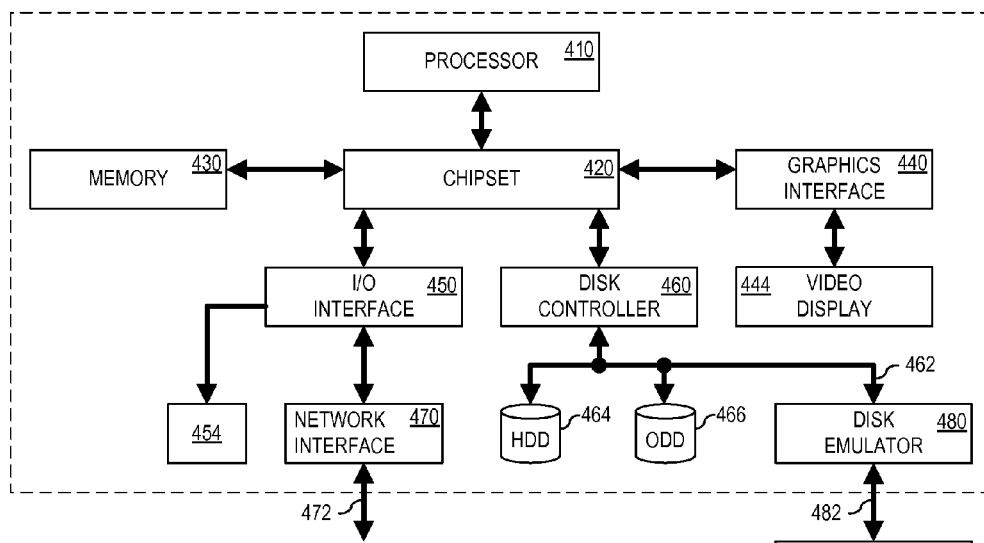
FIG. 4 is a functional block diagram illustrating an exemplary embodiment of an information handling system.

In a particular embodiment, an information handling system can be used to carry out one or more of the methods described above. In another embodiment, one or more of the systems described above can be implemented in the form of an information handling system. FIG. 4 illustrates a functional block diagram of an embodiment of an information handling system, generally designated as 400. Information handling system 400 includes processor 410, a chipset 420, a memory 430, a graphics interface 440, an input/output (I/O) interface 450, a disk controller 460, a network interface 470, and a disk emulator 480.

Processor 410 is coupled to chipset 420. Chipset 420 supports processor 410, allowing processor 410 to process machine-executable code. In a particular embodiment (not illustrated), information handling system 400 includes one or more additional processors, and chipset 420 supports the multiple processors, allowing for simultaneous processing by each of the processors, permitting the exchange of information between the processors and the other elements of information handling system 400. Processor 410 can be coupled to chipset 420 via a unique channel, or via a bus that shares information between processor 410, chipset 420, and other elements of information handling system 400.

Memory 430 is coupled to chipset 420. Memory 430 can be coupled to chipset 420 via a unique channel, or via a bus that shares information between chipset 420, memory 430, and other elements of information handling system 400. In particular, a bus can share information between processor 410, chipset 420 and memory 430. In a particular embodiment (not illustrated), processor 410 is coupled to memory 430 through a unique channel. In accordance with another aspect (not illustrated), an information handling system can include a separate memory dedicated to each of the processors. A non-limiting example of memory 430 includes static, dynamic. Or non-volatile random access memory (SRAM, DRAM, or NVRAM), read only memory (ROM), flash memory, another type of memory, or any combination thereof.

Graphics interface 440 is coupled to chipset 420. Graphics interface 440 can be coupled to chipset 420 via a unique channel, or via a bus that shares information between chipset 420, graphics interface 440, and other elements of information handling system 400. Graphics interface 440 is coupled to a video display 444. Other graphics interfaces (not illustrated) can also be used in addition to graphics interface 440 if needed or desired. Video display 444 can include one or more types of video displays, such as a flat panel display or other type of display device.

I/O interface 450 is coupled to chipset 420. I/O interface 450 can be coupled to chipset 420 via a unique channel, or via a bus that shares information between chipset 420, I/O interface 450, and other elements of information handling system 400. Other I/O interfaces (not illustrated) can also be used in addition to I/O interface 450 if needed or desired. I/O interface 450 is coupled to one or more add-on resources 454. Add-on resource 454 can also include another data storage system, a graphics interface, a network interface card (NIC), a sound/video processing card, another suitable add-on resource or any combination thereof.

Network interface device 470 is coupled to I/O interface 450. Network interface 470 can be coupled to I/O interface 450 via a unique channel, or via a bus that shares information between I/O interface 450, network interface 470, and other elements of information handling system 400. Other network interfaces (not illustrated) can also be used in addition to network interface 470 if needed or desired. Network interface 470 can be a network interface card (NIC) disposed within information handling system 400, on a main circuit board (e.g., a baseboard, a motherboard, or any combination thereof), integrated onto another component such as chipset 420, in another suitable location, or any combination thereof. Network interface 470 includes a network channel 472 that provide interfaces between information handling system 400 and other devices (not illustrated) that are external to information handling system 400. Network interface 470 can also include additional network channels (not illustrated).

Disk controller 460 is coupled to chipset 410. Disk controller 460 can be coupled to chipset 420 via a unique channel, or via a bus that shares information between chipset 420, disk controller 460, and other elements of information handling system 400. Other disk controllers (not illustrated) can also be used in addition to disk controller 460 if needed or desired. Disk controller 460 can include a disk interface 462. Disk controller 460 can be coupled to one or more disk drives via disk interface 462. Such disk drives include a hard disk drive (HDD) 464 or an optical disk drive (ODD) 466 (e.g., a Read/Write Compact Disk (R/W-CD), a Read/Write Digital Video Disk (R/W-DVD), a Read/Write mini Digital Video Disk (R/W mini-DVD), or another type of optical disk drive), or any combination thereof. Additionally, disk controller 460 can be coupled to disk emulator 480. Disk emulator 480 can permit a solid-state drive 484 to be coupled to information handling system 400 via an external interface. The external interface can include industry standard busses (e.g., USB or IEEE 1384 (Firewire)) or proprietary busses, or any combination thereof. Alternatively, solid-state drive 484 can be disposed within information handling system 400.

In the embodiments described above, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described above can be configured as hardware, software (which can include firmware), or any combination thereof. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be software, including firmware embedded at a device, such as a Pentium class or PowerPC™ brand processor, or other such device, or software capable of operating a relevant environment of the information handling system. The device could also be a combination of any of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A storage area network (SAN) comprising:
   a management server coupled to a fabric, the management server implementing a plurality of first device domains on the SAN;
   a storage device coupled to the fabric, the storage device instructing the management server to add a second device domain to the first device domains; and
   a management station connected to the storage device and defining the second device domain, the second device domain including the storage device and a first initiator that is chosen from a plurality of second initiators coupled to the fabric; and directing the storage device to instruct the management server to add the second device domain to the first device domains;
   wherein prior to defining the second device domain, the storage device receives from the management server a list of the second initiators and sends the list to the management station; and
   wherein the storage device further instructs the management server to:
      add a third device domain to the first device domains;
      delete the second device domain from among the first device domains; and
      the management station further defines the third device domain, the third device domain including the storage device and a third initiator that is chosen from among the second initiators; and directs the storage device to instruct the management server to add the third device domain to the first device domains, and delete the second device domain from among the first device domains.

2. The SAN of claim 1, wherein in response to directing the storage device to instruct the management server to add the second device domain:
   the storage device instructs the management server to add the second device domain; and
   the management server implements the second device domain.

3. The SAN of claim 1, wherein the fabric comprises an Internet Small Computer System Interface fabric.

4. The SAN of claim 3, wherein the management server comprises an Internet Storage Name Service management server.

5. The SAN of claim 1, wherein the storage device comprises the management station.

6. A storage area network (SAN) comprising:
   a management server coupled to a fabric, the management server implementing a plurality of first device domains on the SAN;
   a storage device coupled to the fabric, the storage device instructing the management server to add a second device domain to the plurality of first device domains; and
   a management station connected to the storage device and:
      defining the second device domain, the second device domain including the storage device and a first initiator that is chosen from among a plurality of second initiators coupled to the fabric; and
      directing the storage device to instruct the management server to add the second device domain to the plurality of first device domains.

7. The SAN of claim 6, wherein prior to defining the second device domain, the storage device receives from the management server a list of the plurality of second initiators; and sends the list to the management station.

8. The SAN of claim 7, wherein:
   the storage device further instructs the management server to:
      add a third device domain to the plurality of first device domains; and
      delete the second device domain from among the plurality of first device domains; and
   the management station further:
      defines the third device domain, the third device domain including the storage device and a third initiator that is chosen from among the plurality of second initiators; and
      directs the storage device to instruct the management server to add the third device domain to the plurality of first device domains, and delete the second device domain from among the plurality of first device domains.

9. The SAN of claim 6, wherein in response to directing the storage device to instruct the management server to add the second device domain:
 the storage device instructs the management server to add the second device domain; and
 the management server implements the second device domain.

10. The SAN of claim 6, wherein the fabric comprises an Internet Small Computer System Interface fabric.

11. The SAN of claim 10, wherein the management server comprises an Internet Storage Name Service management server.

12. The SAN of claim 6 wherein the storage device comprises the management station.

13. A method comprising:
 coupling a management server to a storage area network (SAN) fabric;
 implementing in the management server a plurality of first device domains on the SAN fabric;
 defining a second device domain, the second device domain including a storage device and a first initiator that is chosen from among a plurality of second initiators coupled to the SAN fabric;
 coupling a storage device to the SAN fabric, the storage device being operable to instruct the management server to add the second device domain to the plurality of first device domains;
 after defining the second device domain, defining a third device domain, the third device domain including the storage device and a third initiator that is chosen from among a plurality of second initiators coupled to the SAN fabric;
 directing the storage device to instruct the management server to add the third device domain to the plurality of first device domains; and
 directing the storage device to instruct the management server to delete the second device domain from the plurality of first device domains.

14. The method of claim 13, further comprising directing the storage device to instruct the management server to add the second device domain to the plurality of first device domains.

15. The method of claim 14, further comprising, prior to defining the second device domain, receiving at the storage device a list of the plurality of second initiators.

16. The method of claim 15, wherein the steps of defining a second device domain and directing the storage device are performed by a management station.

17. The method of claim 16, further comprising:
 directing the storage device to instruct the management server to add the second device domain to the plurality of first device domains; and
 adding the second device domain to the plurality of first device domains.

18. The method of claim 16, wherein the management station is connected to the storage device.

19. The method of claim 16, wherein the storage device comprises the management station.

* * * * *